US011953138B2

(12) United States Patent
Randrianarivony et al.

(10) Patent No.: US 11,953,138 B2
(45) Date of Patent: Apr. 9, 2024

(54) SWIVEL STACK FOR TRANSFER OF FLUID ACROSS A ROTARY INTERFACE AND METHOD FOR MANUFACTURING SUCH A SWIVEL STACK

(71) Applicant: SINGLE BUOY MOORINGS INC., Marly (CH)

(72) Inventors: Liva Christian Randrianarivony, Bât. Aigue Marine (MC); Sébastien Jean-François Truchi, Bât. Aigue Marine (MC)

(73) Assignee: SINGLE BUOY MOORINGS INC., Marly (CH)

( * ) Notice: Subject to any disclaimer, the term of this patent is extended or adjusted under 35 U.S.C. 154(b) by 357 days.

(21) Appl. No.: 17/605,414

(22) PCT Filed: Apr. 23, 2020

(86) PCT No.: PCT/EP2020/061354
§ 371 (c)(1),
(2) Date: Oct. 21, 2021

(87) PCT Pub. No.: WO2020/216854
PCT Pub. Date: Oct. 29, 2020

(65) Prior Publication Data
US 2022/0228688 A1    Jul. 21, 2022

(30) Foreign Application Priority Data
Apr. 24, 2019   (EP) ................................. 19170914

(51) Int. Cl.
*F16L 39/06*   (2006.01)

(52) U.S. Cl.
CPC .................................... *F16L 39/06* (2013.01)

(58) Field of Classification Search
CPC .................................... F16L 39/06; F16L 39/00
See application file for complete search history.

(56) References Cited

U.S. PATENT DOCUMENTS 9,605,786 B2 *   3/2017   Boatman ................. F16L 39/06
10,100,962 B2 *  10/2018  Boatman ................. F16L 39/06
(Continued)

OTHER PUBLICATIONS

International Search Report for PCT/EP2020/061354 dated Jul. 13, 2020, 3 pages.
(Continued)

*Primary Examiner* — James M Hewitt, II
(74) *Attorney, Agent, or Firm* — NIXON & VANDERHYE (57) ABSTRACT

A swivel stack for transfer of fluid across a rotary interface around a rotation axis between incoming and outgoing flow-lines, includes: a group of lower, upper and central annular elements; the lower, upper and central element each being centered around the axis; the central element positioned between the lower and upper elements; an outer annular element centered around the axis between the lower and upper elements; a toroidal chamber between the central and outer elements; downward and upward facing surfaces of the outer element being adjacent to the upward surface of the lower element and the downward surface of the upper element; the lower element's upward surface and the upper element's downward surface having a first stepped surface and the outer element's upward and downward surfaces have a second stepped surface, such that at least two annular cavities centered around the rotation axis are provided.

20 Claims, 7 Drawing Sheets (56) References Cited

U.S. PATENT DOCUMENTS

| | | |
|---|---|---|
| 2015/0226358 A1 | 8/2015 | Boatman et al. |
| 2016/0369924 A1 | 12/2016 | Boatman et al. |
| 2017/0002964 A1 | 1/2017 | Boatman et al. |
| 2018/0313486 A1* | 11/2018 | Randrianarivony .... B63B 35/44 |

OTHER PUBLICATIONS

Written Opinion of the ISA for PCT/EP2020/061354 dated Jul. 13, 2020, 8 pages.

* cited by examiner

SWIVEL STACK FOR TRANSFER OF FLUID ACROSS A ROTARY INTERFACE AND METHOD FOR MANUFACTURING SUCH A SWIVEL STACK

This application is the U.S. national phase of International Application No. PCT/EP2020/061354 filed Apr. 23, 2020 which designated the U.S. and claims priority to EP Patent Application No. 19170914.6 filed Apr. 24, 2019, the entire contents of each of which are hereby incorporated by reference.

BACKGROUND OF THE INVENTION

Field of the Invention

The present invention relates to a swivel stack for transfer of fluid across a rotary interface around a rotation axis between an incoming flow-line and an outgoing flow-line.

Moreover, the invention relates to a turret mooring system comprising such a swivel stack. Also, the invention relates to a floating offshore construction provided with such a swivel stack and to a method for manufacturing such a swivel stack

Description of the Related Art

Toroidal fluid swivels are known in the art for transfer of high-pressure fluids across a rotary interface between an incoming fluid line and an outgoing product piping. Applications for such a swivel include for example offshore oil and gas explorations where high-pressure flows of oil and/or gas are transferred from a (deep-sea) offshore well to a floating vessel such as a Floating Production Storage and Offloading (FPSO) vessel. Typically, such a floating vessel is equipped with a turret mooring system that can couple a mooring buoy or a "mooring structure" and that holds one or more riser lines from the well, to product piping ducts on the vessel. Since the turret mooring system should allow some rotation between the vessel and the buoy, the swivel is likewise adapted to provide rotation between the incoming fluid line and the product piping.

In swivel designs, the rotary interface is provided with seals to prevent leakage. Within the rotary interface the seals are subjected to high pressure differences between the high-pressure fluids running through the swivel and ambient.

Also, the seals are subjected to mechanical wear due to rotation of the interface. In the prior art, swivels (swivel stacks) thus face several issues affecting their performance and reliability; the main issue being the practical inability to change-out the dynamic seals in-situ, due to the relatively large size of the swivel parts.

Another major issue is the difficulty to meet seal design criteria, especially when seal diameter, temperature range, or fluid pressure increases. It is an object of the invention to overcome or mitigate the disadvantages of the prior art.

SUMMARY OF THE INVENTION

The object is achieved by a swivel stack as disclosed and claimed. The structure of the swivel stack allows a relatively uncomplicated manner of assembly or disassembly, which also enhances the procedure to change-out any seals in the swivel stack.

Further, the invention relates to a turret mooring system equipped with a swivel stack as defined above, to a floating offshore construction provided with a swivel stack as defined above and to a method for manufacturing a swivel stack as defined above.

BRIEF DESCRIPTION OF THE DRAWINGS

The invention will be explained in more detail below with reference to drawings in which illustrative embodiments thereof are shown. The drawings are intended exclusively for illustrative purposes and not as a restriction of the inventive concept. The scope of the invention is defined in the appended claims.

In the following description of embodiments, items indicated by an identical reference sign refer to the same or a similar item.

DESCRIPTION OF THE PREFERRED EMBODIMENTS

Figure 1:
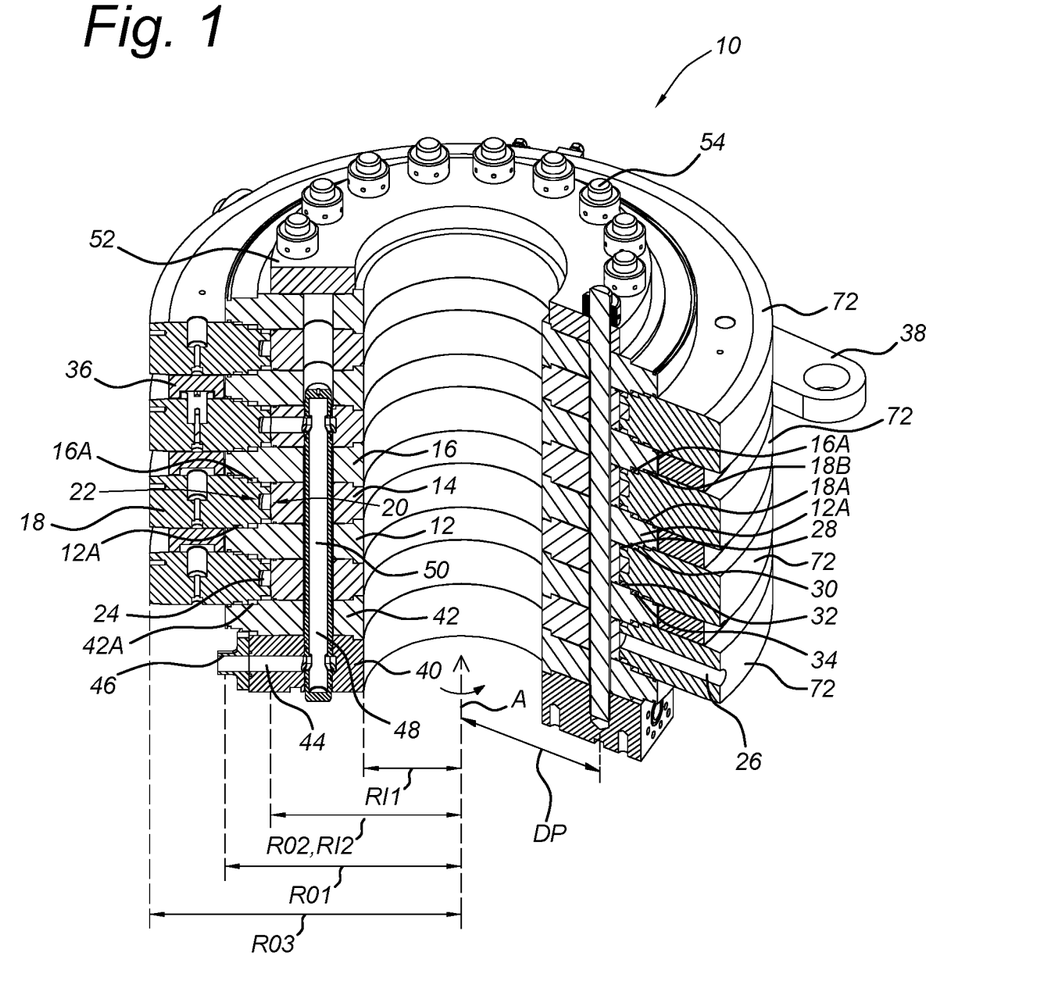
FIG. 1 shows a cross-section in perspective view of a swivel stack according to an embodiment of the invention.

FIG. 1 shows a cross-section in perspective view of a swivel stack according to an embodiment of the invention.

A rotary interface 72 of a swivel stack 10 in accordance with the invention is constructed from a plurality of annular elements comprising a group of inner annular elements and an outer annular element that are all centered around a common rotation axis A.

In this rotary interface, the outer annular element is configured for rotation around the rotation axis A relative to the group of inner annular elements.

The rotary interface comprises a group of inner annular elements 12, 14, 16 and an outer annular element 18. The group of inner annular elements comprises a lower annular element 12, a central annular element 14 and an upper annular element 16.

Each of inner annular elements 12, 14, 16 has a cylindrical inner surface at an inner radius RI1. The lower and upper annular elements 12, 16 each have a cylindrical outer surface at a first outer radius RO1. The central annular element 14 has a cylindrical outer surface at a second outer radius RO2. The second outer radius RO2 is smaller than the first outer radius RO1.

When the inner, central and outer annular elements are stacked on each other, with the central annular element 14 positioned between the lower annular element 12 and the upper annular element 16, a circular trench is present between facing surfaces 12a, 16a of the lower annular element and the upper annular element, which surfaces are substantially perpendicular to the rotating axis A.

The outer annular element 18 has a cylindrical inner surface at a second inner radius RI2 and a cylindrical outer surface at a third outer radius RO3, and is also centered around the rotation axis A. The second inner radius RI2 of the outer annular element 18 is somewhat larger than the second outer radius RO2 of the central inner annular element 14 in such a way there is a radial gap G (see FIG. 2 and FIG. 3) of about 1 mm between the central inner annular element and the outer annular element. The outer annular element 18 is arranged in the circular trench between the lower and the upper inner annular elements 12, 16 such that the cylindrical inner surface 22 of the outer annular element abuts the outer cylindrical surface 20 of the central inner annular element. Along the circumference of the cylindrical inner surface of the outer annular element a recess 24 is provided such that a toroidal chamber 24a is formed between the cylindrical outer surface 20 of the central inner annular element and the cylindrical inner surface 22 of the outer annular element 18.

In the outer annular element 18, a conduit 26 in radial direction is provided between the recess 24 and the outer circumference to provide an outlet (or inlet) of the toroidal chamber 24a.

The upward surface 12a of the lower annular element 12 and the downward surface 16a of the upper annular element 16 that each extend outward beyond the cylindrical outer surface 20 of the central annular element 14 at the second outer radius RO2, are provided with a first stepped surface. The outer annular element 18 has upward and downward surfaces 18a, 18b with a second stepped surface that is complementary to the first stepped surface.

Between the downward facing surface 16a of the upper annular element 16 and the upward facing surface 18b of the outer annular element 18 and between the upward facing surface 12a of the lower annular element 12 and the downward facing surface 18a of the outer annular element 18, annular cavities 28, 30, 32, 34 are formed in which face seal type seal rings are arranged (not shown here). The arrangement of the annular cavities and the seal rings will be described in more detail with reference to FIG. 2.

Referring to FIG. 1, the swivel stack can comprise a plurality of rotary interfaces. To simplify stacking, the lower and upper annular elements 12, 16 are designed with a same shape of their upper and lower surfaces 12a, 16a (perpendicular to the rotation axis A). In this manner an upper annular element 16 of a first rotary interface can be used as a lower annular element 12 of a second rotary interface stacked on top of the first rotary interface.

In between each pair of stacked outer annular elements a coupling ring or drive ring 36 is placed. The coupling rings are configured to couple the outer annular element pairwise for joined rotation. One of coupling rings is fitted with a pair of lugs (not shown) designed to receive a pair of drive arms 38 for coupling to an external structure (not shown) on the floating structure (not shown).

The swivel stack 10 comprises a base annular element 40 on which a lower support annular element 42 is arranged. The lower support annular element 42 has an upward facing surface 42a that has an identical shape as an upward facing surface 12a of the lower annular element 12 as described above. The lower support annular element 42 has a stepped upward facing surface on which an outer annular element 18 can be arranged in a manner that annular cavities are present in between the annular elements 42, 18.

The base annular element 40 is provided on its circumference with inlet ports 44 (and/or outlet ports) in radial direction that are each configured to be coupled with an incoming flow-line 46 or outgoing flow-line, respectively.

Further, each inlet or outlet port 44 is coupled within the base annular element 40 with a conduit 48 extending upward and parallel to the rotation axis A.

Each of the inner annular elements 12, 14, 16 is provided with at least one through-hole 50 for transport of (hydrocarbon) fluids parallel to the rotation axis A. In each inner annular element 12, 14, 16 the at least one through-hole 50 is positioned at a location corresponding with the location of the conduit 48 in the base annular element 40.

On the top of the swivel stack 10, a closing annular element 52 can optionally be arranged. The closing annular element 52 can also function as a support or (fluid) connector for an other swivel stack located above.

Within the swivel stack 10, the inner annular elements 12, 14, 16 are joined between the base annular element 40 and the closing annular element 52 by a plurality of bolted rods 54 extending through holes arranged on a pitch diameter DP of the annular elements. A more detailed illustration will be given below with reference to FIG. 2.

Figure 2:
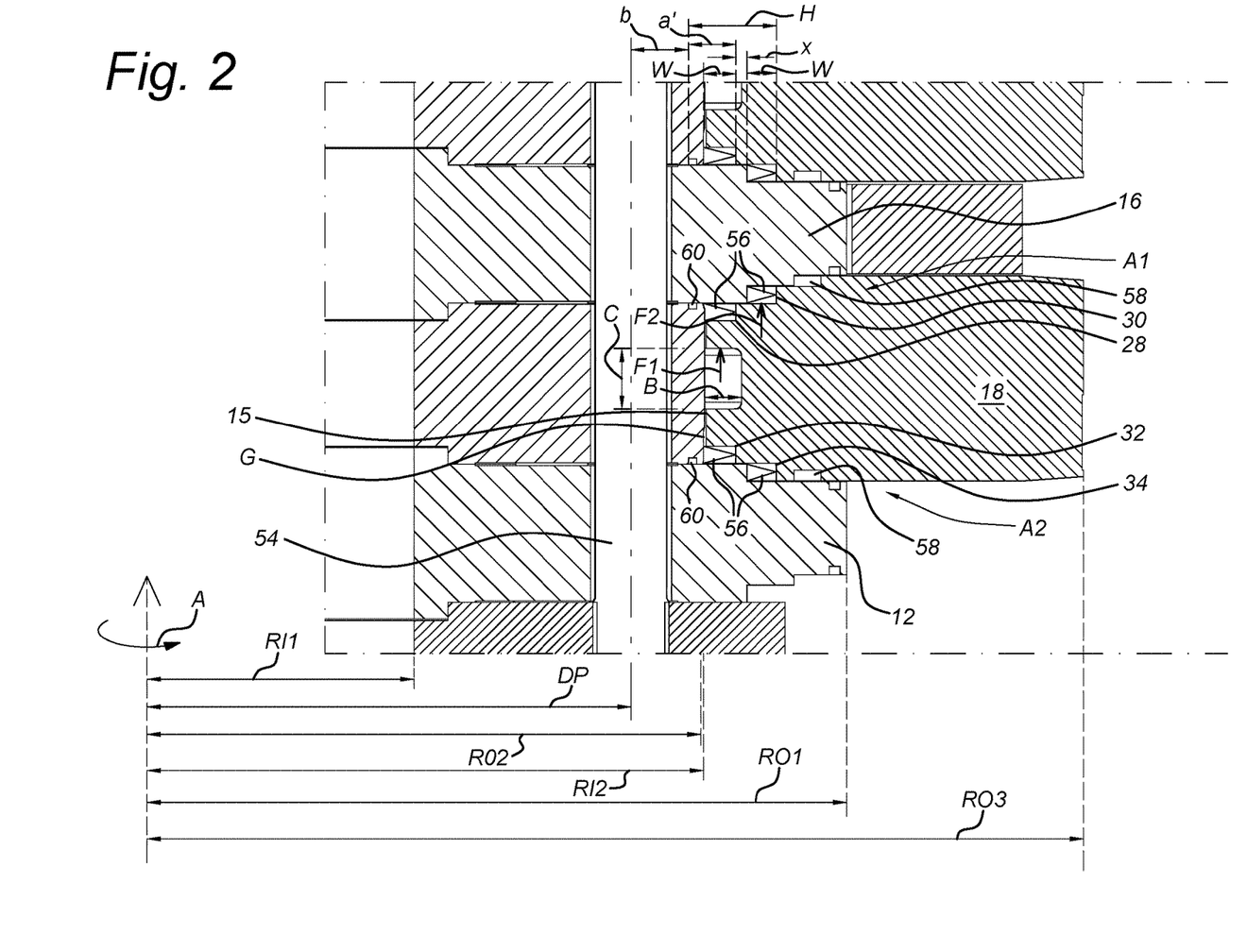
FIG. 2 shows a detailed cross-section of the rotary interface of a swivel stack according to an embodiment of the invention.

FIG. 2 shows a detailed cross-section of the rotary interface of a swivel stack according to an embodiment of the invention.

The first and second stepped surfaces have a layout in which four annular cavities 28, 30, 32, 34 are centered around the rotation axis A. The first and second stepped surfaces have a rectangular cross-section and are provided between the central outer annular element 18 and the lower and upper inner annular elements 12, 16. Two of the annular cavities 28, 30 are arranged at a first interface A1 between the facing surfaces 16a, 18b of the upper annular element 16 and the outer annular element 18. The other two annular cavities 32, 34 are arranged at a second interface A2 between the facing surfaces 12a, 18a of the lower annular element 12 and the outer annular element 18. In each of the annular cavities 28, 30, 32, 34 a face seal type seal ring 56 is installed.

In FIG. 2, a portion of an arrangement of the lower annular element 12, the central annular element 14, the upper annular element 16 in combination with the outer annular element 18 is shown. Also, a portion of a bolted rod 54 is shown, extending through the lower, central and upper annular elements.

Above and below the toroidal chamber 24a, the annular cavities 28, 30, 32, 34 are arranged at a first and second interface A1, A2 between the outer annular element 18 and the upper annular element 16, and the central annular element 14 and the lower annular element 12, respectively.

At both first and second interfaces A1, A2 an hydraulic area H, i.e., a radial area H where the annular cavities and corresponding seal rings are located, is kept minimal. That is, each of the annular cavities has a radial width W and each seal ring has a corresponding width when placed in the associated annular cavity. Between the two annular cavities 28, 30; 32, 34 in each of the first interface A1 and the second interface A2 a non-zero interspace X is arranged. Thus the radial area H has a width equal to the width W of the two annular cavities 28, 30;32, 34 plus the interspace X in the same interface A1; A2.

In addition, to keep the hydraulic area H minimal, in each interface one of the two annular cavities 28; 32 is arranged directly adjacent to the cylindrical outer end surface 15 of the central annular element 14.

A radial width B of the toroidal chamber 24a is equal to or smaller than a height C of the toroidal chamber 24a. Additionally, the radial width B of the toroidal chamber is smaller than the width of the hydraulic area H (i.e., the width W of the two annular cavities combined 28, 30;32, 34 plus the interspace X in the same interface A1; A2). At the same time, the inner diameter of the radially inner seal ring is substantially equal to the inner diameter of the toroidal chamber. When the toroidal chamber is under operational pressure, these measures have the effect that the vertical force F2 on the seals in the first and second interfaces A1; A2 is smaller than the vertical force F1 on the upper and lower radial walls of the toroidal chamber 24a.

In addition, in each of the upward and downward facing surfaces 18a, 18b of the outer annular element 18, a bushing 58 (plain bearings) is positioned outside the hydraulic area H, thus at larger radius than the radius of the seal rings 56.

In an embodiment, the bolted rods 54 are positioned at a distance to the second outer radius RO2 so as to leave 5 to 10 mm gap between the bolt hole and an O-ring seal groove 60 holding an O-ring seal ensuring tightness between the central annular element 14 and the lower/upper inner annular element 12; 16. To achieve this, the centre of each rod is located towards the outer radius RO1 and away from the inner radius RI1 in the central annular element.

In this manner, the clamping force on each of the inner annular elements 12, 14, 16 is mainly acting on the O-ring seal groove 60 to limit opening and risk of extrusion of the O-ring seal out of the O-ring seal groove 60 when associated flow lines and toroidal chamber in the swivel stack 10 are under high operating pressure. This technique translates the attempt to minimize the prying effect on the bolted rods (see below).

It is recognized that a pressure induced end cap force is acting on the hydraulic area H—from the inner diameter of the O-ring seal groove 60 to an outer diameter of the outer annular cavity groove (holding the face seal). This force tends to open both the interface between the central annular element and lower annular element and the interface between the central annular element and upper annular element. The pressure induced end cap force is amplified by the ratio of the distance of the hydraulic area H to the inner radius RI1 to the distance of the bolt 54 to the same inner radius RI1 (prying effect): obviously the larger the distance of the bolt 54 to inner radius RI1, the smaller the tensile load on the bolt 54. This property is vital for this type of design.

According to an embodiment, the first and second stepped surfaces have a layout in which at least two annular cavities 28, 30, 32, 34 are centered around the rotation axis A with half of the at least two of the annular cavities located at a first interface between the downward facing surface of the upper annular element and the upward facing surface of the outer annular element and the other half of the at least two annular cavities located at a second interface between the upward facing surface of the lower annular element and the downward facing surface of the outer annular element, respectively.

Figure 3:
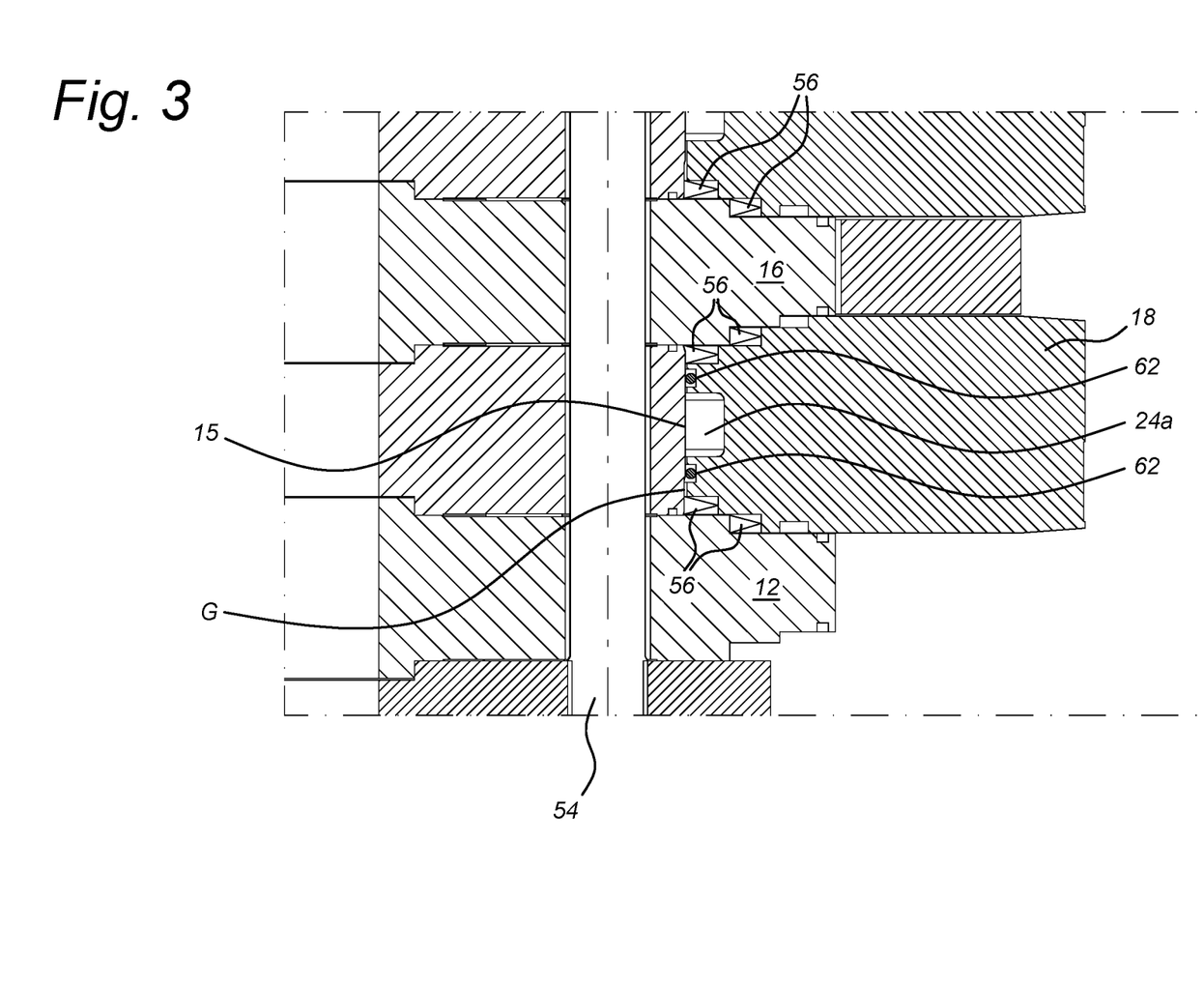
FIG. 3 shows a detailed cross-section of the rotary interface of a swivel stack according to an embodiment of the invention.

FIG. 3 shows a detailed cross-section of the rotary interface of a swivel stack according to an embodiment of the invention.

The rotary interface shown in FIG. 3 is largely identical to the rotary interface of FIG. 2. Features with identical reference sign as in FIG. 2 will not be described here.

In the interface shown in FIG. 3, additional recesses 62 are provided in the outer annular element 18 on either side of the toroidal chamber 24a to fit two additional seal rings 64, piston orientated. The additional seal rings 64 may be referred to as isolation seals, providing further isolation of the toroidal chamber 24a in the circumferential direction of the rotary interface.

Figure 4A:
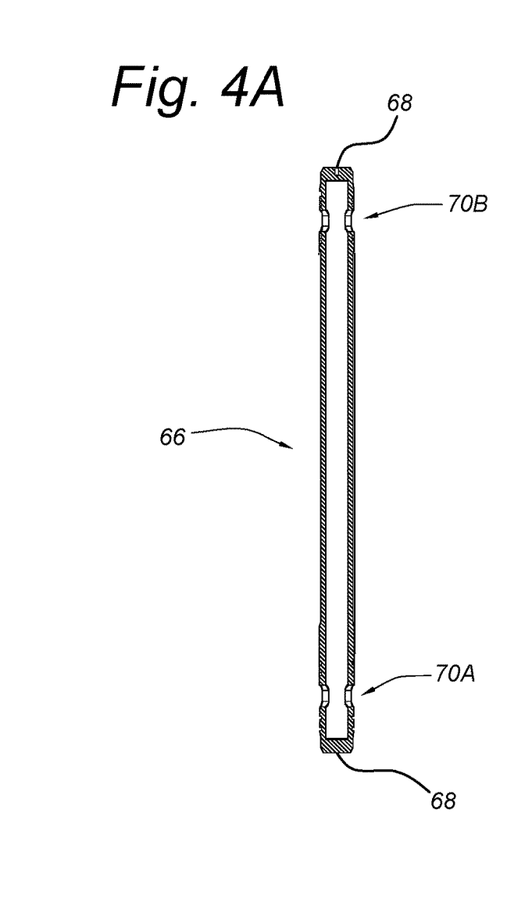
FIGS. 4A and 4B shows detailed cross-sections of a stab-in pipe for use in a swivel stack according to an embodiment of the invention.
Figure 4B:
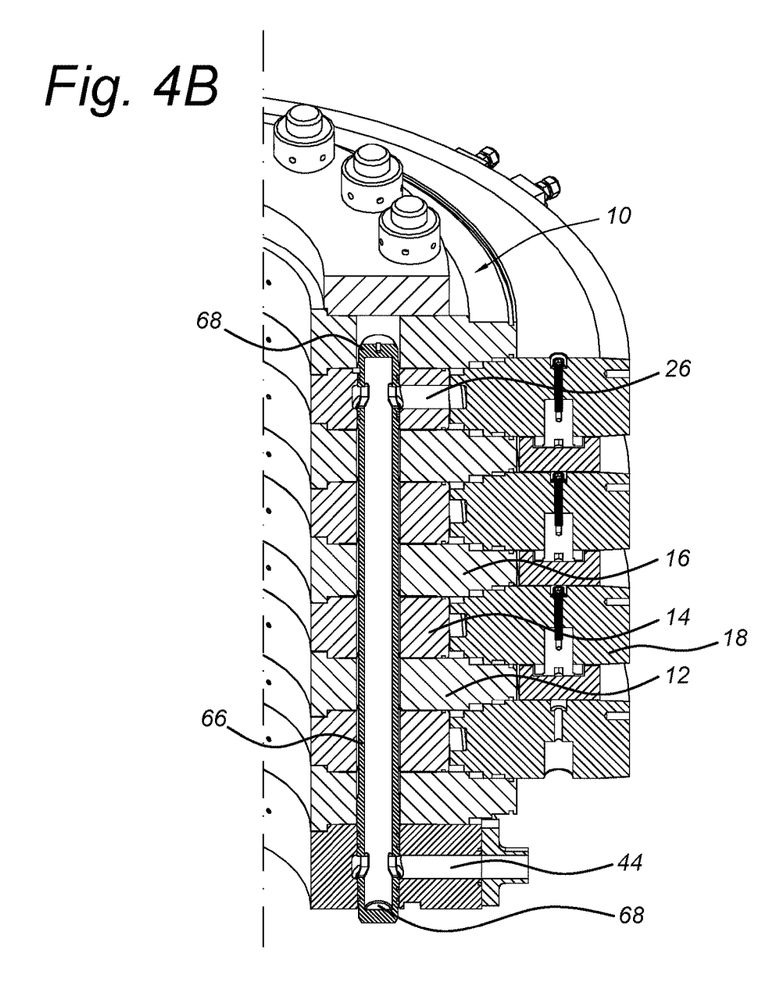

FIGS. 4a and 4b show details of a stab-in tube 66 for use in a swivel stack 10 according to an embodiment of the invention.

In the through-holes 50 extending through the inner annular elements 12, 14, 16 of the swivel stack 10 a stab-in tube 66 can be placed to provide a conduit that runs between the base annular element 40 and the central annular element 18 associated with the respective through-hole connected to radial conduit 26 of the central annular element.

The stab-in tube 66 has closed end caps 68 and is provided with openings 70a, 70b in its side wall at the level of the radial conduit 44 of the base annular element 40 and the level of the radial conduit 26 in the central annular element 18, respectively.

In this manner a flow path for the fluid flowing through the stab-in tube is obtained that is leak-proof.

FIG. 4A shows a cross-section of the stab-in tube 66. FIG. 4B shows a cross-section of a swivel stack with a stab-in tube 66 mounted in the through-holes 50 of the inner annular elements 12, 14, 16.

Figure 5:
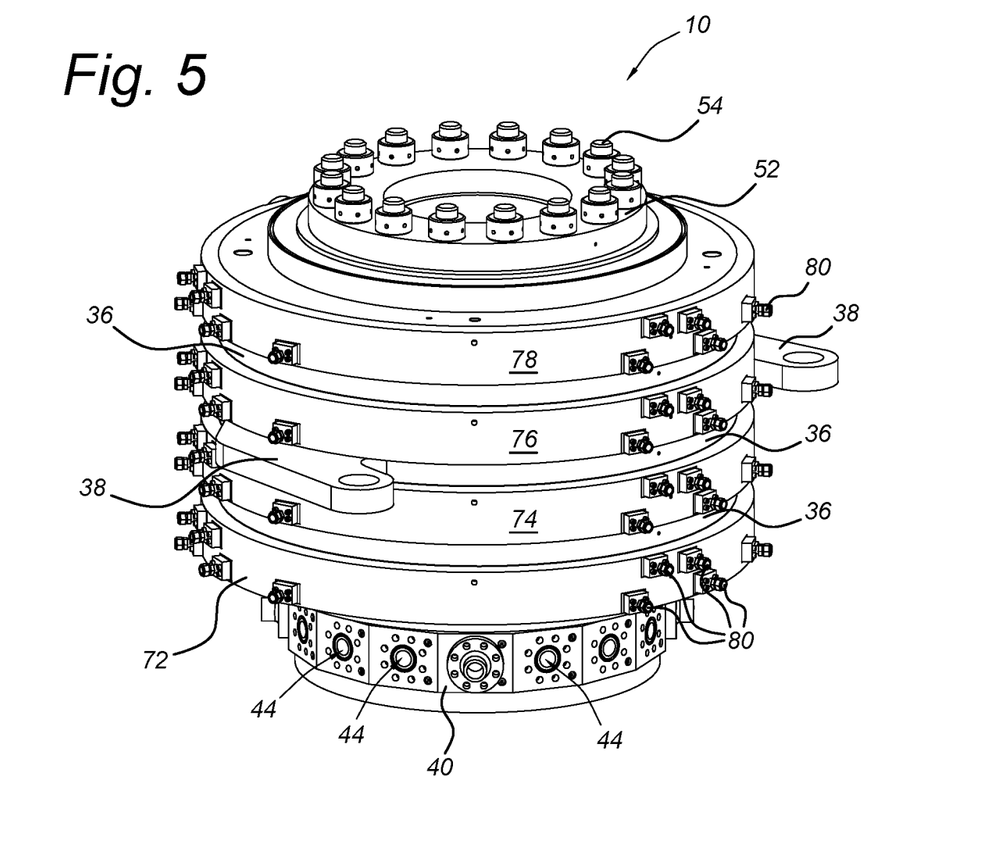
FIG. 5 shows a perspective view of a swivel stack according to an embodiment of the invention.

FIG. 5 shows a perspective view of a swivel stack according to an embodiment of the invention.

The swivel stack 10 depicted here, comprises the base annular element 40, a number of rotary interfaces 72, 74, 76, 78 and a closing annular element 52.

Further, the swivel stack 10 comprises a pair of coupling arms 30 attached to one of the coupling rings 36. The coupling arms are configured to be coupled to a vessel (not shown) in which the swivel stack is mounted. The coupling arms provide a fixed orientation of the rotary interfaces with respect to the vessel.

On the outer cylindrical end surface of each rotary interface additional probing ports 80 can be present, which provide access to leak ports (not shown) in the hydraulic area H.

Figure 6:
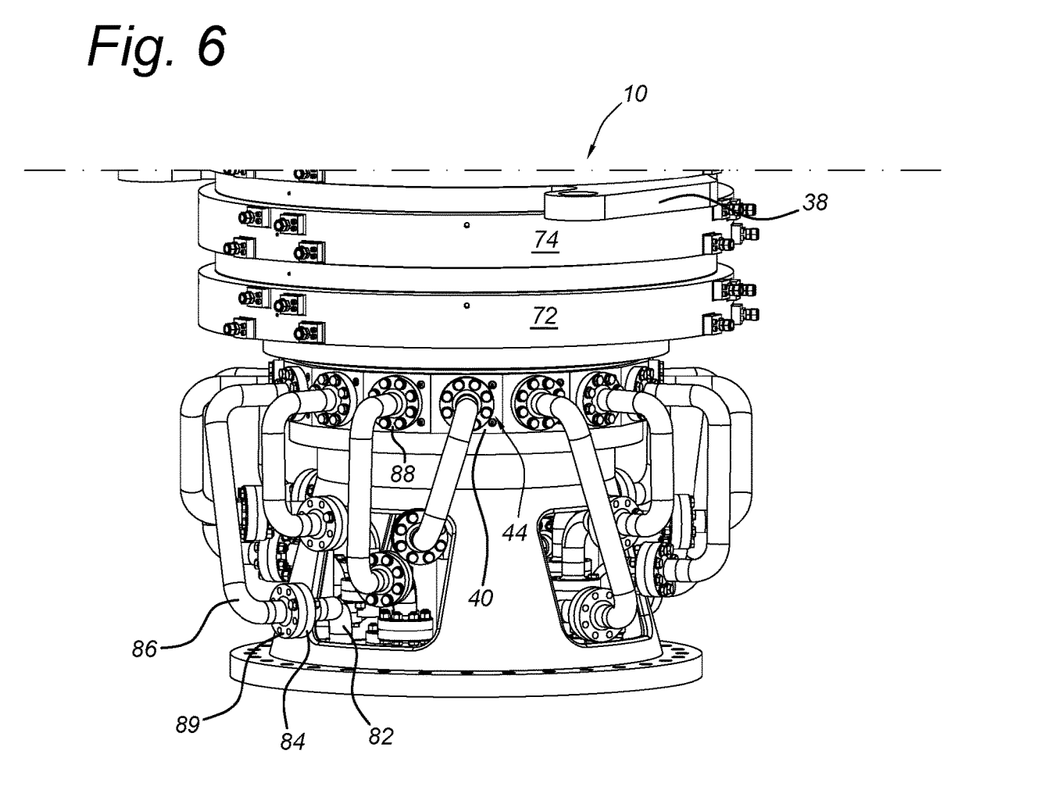
FIG. 6 shows a perspective view of a portion of a manifold block in accordance with an embodiment of the invention.

FIG. 6 shows a perspective view of a manifold block in accordance with an embodiment of the invention.

When the swivel stack 10 is arranged on a turret mooring system on a floating object such as a vessel, the ports 44 for incoming/outgoing fluid on the base annular element 40 of the swivel stack can be coupled to riser lines 82 attached to a manifold structure (earthbound part) within the turret of the turret mooring system.

According to an embodiment, a riser line 82 is equipped with a pipe flange 84. The pipe flange 84 of the riser line 82 is then coupled to an associated port 44 on the base annular element 40 by a flange 88 of spool piece 86 or connecting tube. The spool piece 86 is equipped with a spool piece flange 89 that is configured for connecting to the pipe flange 84 of the riser line 82. Spool pieces of different lengths and with different orientations of connectors on the flanges 88, 89 can be used for making a fluid connection between a riser line 82 and a port 44 for incoming/outgoing fluid.

Figure 7:
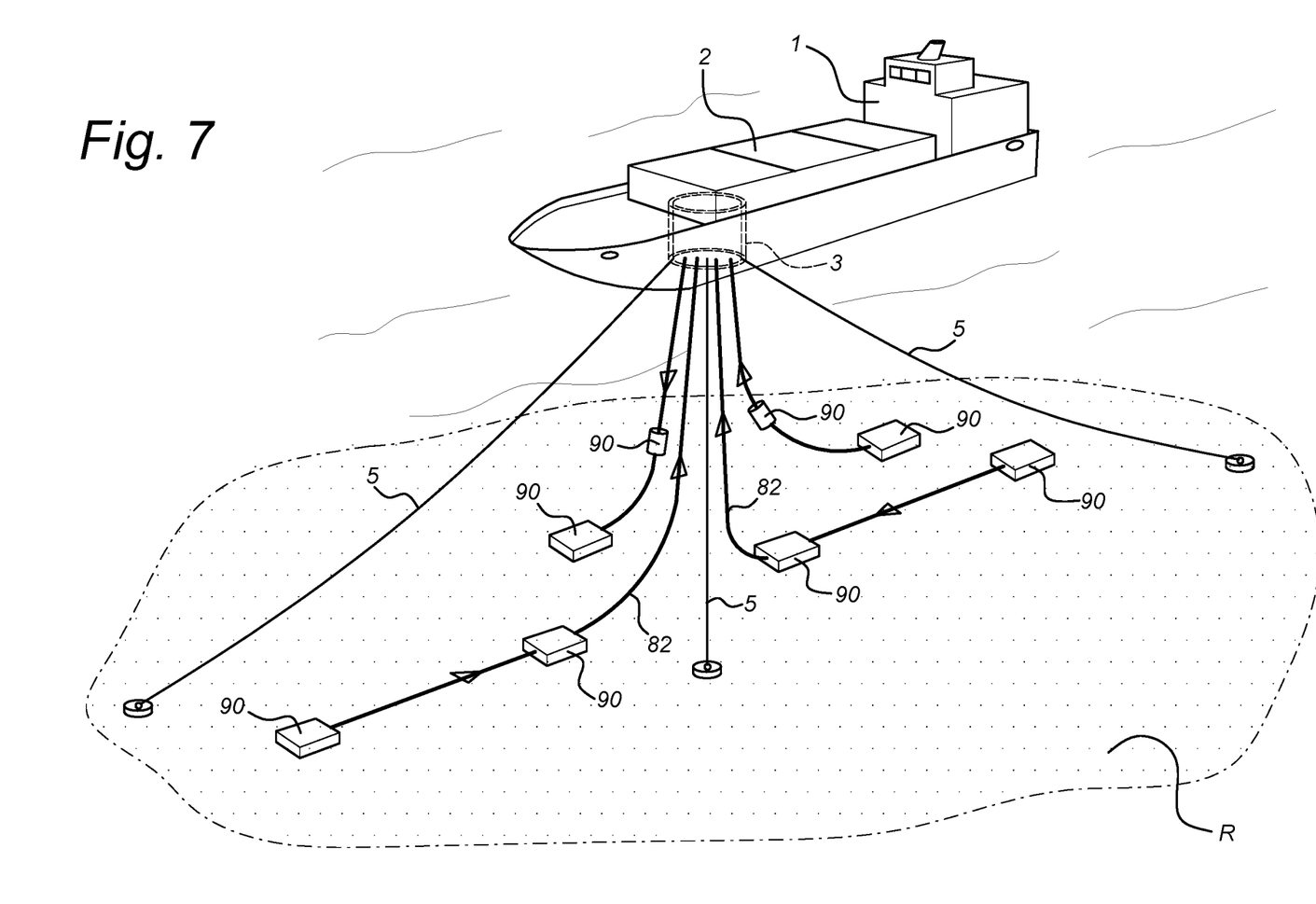
FIG. 7 shows schematically a floating offshore construction equipped with a swivel stack in accordance with an embodiment of the invention.

FIG. 7 shows schematically an example of a floating offshore construction equipped with a swivel stack in accordance with an embodiment of the invention.

A floating production unit 1 such as an FPSO vessel, or in general an offshore vessel, is moored at a location at sea near a reservoir R in the seabed. Process equipment 2 on the vessel is shown schematically.

The floating production unit 1 is turret moored. In FIG. 7, according to an embodiment, the floating production unit is shown as turret moored, by means of a turret mooring system.

Turret mooring systems provide a turret mooring structure comprising a turret structure 3 such as a mooring buoy and a support structure mounted on either the outside or the inside of the floating production unit 1. The turret structure 3 is anchored to the seabed with anchoring lines 5. Riser lines 82 (and other lines and other equipments 90 such as umbilical lines, gas/water injection lines, electric power lines, valves/shutters, etc.) are extending between the reservoir R under the seabed and the turret structure 3. The support structure, provided on the floating production unit 1, has a receptacle for receiving the turret structure 3, such that rotation of the floating production unit 1 about the turret structure 3 is still possible. In this manner, the floating production unit 1 can weathervane under influence of wind, waves, currents and/or drifting ice and adopt the position of least resistance with regard to the environment, while the riser lines remain at their unrotated position.

A swivel stack 10 according to an embodiment of the invention is arranged in the turret mooring system to provide one or more rotary interfaces between the riser lines 82 and process equipment 2 on the floating vessel.

According to an embodiment, the inner and outer annular elements are obtained from steel forgings and machined to the desired final shapes. The steel forgings may be based on carbon steel or stainless steel.

The invention has been described with reference to some embodiments. The swivel stack shown is described here by way of an example. Configurations with a different number of rotary interfaces can be constructed within the scope of the invention.

Obvious modifications and alterations will occur to the person skilled in the art upon reading and understanding the preceding detailed description, which is to be considered in all respects only as illustrative and not restrictive. It is intended that the invention be construed as including all such modifications and alterations insofar as they come within the scope of the appended claims. The scope of the invention is, therefore, indicated by the appended claims rather than by the foregoing description.

REFERENCES

Floating production unit 1
Processing equipment 2
Turret structure 3
Anchoring line 5
Swivel stack 10
Inner annular elements 12, 14, 16
Cylindrical outer end surface 15
Upward surface 12*a*
Downward surface 16*a*
Outer annular element 18
Downward facing surface 18*a*
Upward facing surface 18*b*
Outer cylindrical surface 20
Cylindrical inner surface 22
Recess 24
Toroidal chamber 24*a*
Conduit 26
Annular cavities 28, 30, 32, 34
Coupling ring or drive ring 36
Pair of drive arms 38
Base annular element 40
Lower support annular element 42
Inlet/outlet ports 44
Flow-line 46
Through-hole 50
Closing annular element 52
Bolt 54
Face seal type seal ring 56
Bushing 58
O-ring seal groove 60
Additional recess 62
Isolation seal 64
Stab-in tube 66
Opening 70*a*, 70*b*
Rotary interface 72, 74, 76, 78
Probing port 80
Riser line 82
Pipe flange 84
Spool piece 86
Spool piece flange 88
Equipment 90
Interface A1, A2
Rotating axis A
Pitch diameter DP
Radial gap G
Hydraulic area H
Radial width of chamber B
Height of chamber C
Vertical force F1, F2
Reservoir R
First outer radius RO1
Second outer radius RO2
Third outer radius RO3
First inner radius RI1
Second inner radius RI2
Radial width W
Interspace X

The invention claimed is:

1. Swivel stack for transfer of fluid across a rotary interface around a rotation axis between an incoming flow-line and an outgoing flow-line, the swivel stack comprising:

a group of inner annular elements that comprises a lower annular element, an upper annular element and a central annular element;

the lower annular element being centered around the rotation axis with an inner radius and a first outer radius;

the upper annular element being centered around the rotation axis with the inner radius and the first outer radius;

the central annular element being centered around the rotation axis and having an outer cylindrical end surface, positioned between the lower annular element and the upper annular element, the central annular element having the inner radius and a second outer radius, with the second outer radius between inner radius and first outer radius, in a manner that a circular trench is present between an upward facing surface of the lower annular element and a downward facing surface of the upper annular element, the downward and upward facing surfaces each being perpendicular to the rotating axis;

the swivel stack further comprising:

an outer annular element centered around the rotation axis and having an inner end surface with a second inner radius and a third outer radius, with the third outer radius larger than the first outer radius and the second inner radius being substantially equal to the second outer radius with a gap between the outer annular element and the central inner annular element; the downward and upward facing surfaces of the outer annular element being directly adjacent to the upward facing surface of the lower annular element and the downward facing surface of the upper annular element, respectively;

the inner end surface of the outer annular element abutting the flat cylindrical end surface of the central annular element and provided with a circular trench, such that a toroidal chamber is formed between the central annular element and the outer annular element, wherein the upward facing surface of the lower annular element and the downward facing surface of the upper annular element have a first stepped surface and the upward and downward facing surfaces of the outer annular element have a second stepped surface, and the first and second stepped surfaces are configured in a manner that at least two annular cavities centered around the rotation axis and having a rectangular cross-section are provided, half of the at least two of the annular cavities at a first interface between the downward facing surface of the upper annular element and the upward facing surface of the outer annular element and the other half of the at least two annular cavities at a second interface between the upward facing surface of the lower annular element and the downward facing surface of the outer annular element, respectively, and wherein a radial width of the toroidal chamber is equal to or smaller than a height of the toroidal chamber, and the radial width of the toroidal chamber is smaller than a width of the two annular cavities combined.

2. The swivel stack according to claim 1, wherein a face seal type seal ring is arranged in each of the at least two annular cavities.

3. The swivel stack according to claim 1, wherein in each interface said half of the at least two annular cavities are separated from each other by an interspace in radial direction.

4. The swivel stack according to claim 1, wherein in a radial direction each of the annular cavities is defined between an outward edge on one annular element selected from the group of inner annular elements and an inward edge on the outer annular element;

surfaces of the inward and outward edges being parallel to the direction of the rotation axis, and in the direction parallel to the rotation axis each of the annular cavities is defined at the first interface between the upward facing surface of the outer annular element and the downward facing surface of the upper annular element and at the second interface between the downward facing surface of the outer annular element and the upward facing surface of the lower annular element.

5. The swivel stack according to claim 1, wherein each of the annular cavities is defined by a width WS in the radial direction and a depth HS in the direction parallel to the rotation axis.

6. The swivel stack according to claim 1, wherein an annular additional recess above and an annular additional recess below the circular trench in the inner end surface of the outer annular element are provided; each additional recess fitted with a piston orientated seal ring.

7. The swivel stack according to claim 1, wherein in each interface an annular bushing is arranged and the radially outermost annular cavity is separated from the annular bushing by a second interspace in radial direction.

8. The swivel stack according to claim 1, wherein each of the lower annular element, upper annular element and central annular element are configured with at least one through-hole extending in the direction parallel to the rotation axis, the at least one through-hole having a corresponding position in each of the lower annular element, upper annular element and central annular element.

9. The swivel stack according to claim 8, wherein the central annular element is configured with at least one radial conduit running from one of the at least one through-hole to the outer cylindrical end surface, the radial conduit arranged for fluid communication with the toroidal chamber.

10. The swivel stack according to claim 1, further comprising a base annular element having at least one through-hole with a position corresponding to the position of the at least one through-hole in each of the lower annular element, upper annular element and central annular element, and further comprising a radial conduit extending from the through-hole to a port on an outer cylindrical end surface of the base annular element.

11. The swivel stack according to claim 9, wherein the outer annular element further has at least one radial conduit extending from the through-hole to a port on an outer cylindrical end surface of the outer annular element.

12. The swivel stack according to claim 8, wherein a stab-in pipe is arranged in the correspondingly positioned through-holes of the lower annular element, upper annular element and central annular element, the stab-in pipe running between the radial conduit of the base annular element and the radial conduit of the central annular element.

13. Turret mooring system comprising a swivel stack for transfer of fluid across a rotary interface around a rotation axis between an incoming flow-line and an outgoing flow-line in accordance with claim 1.

14. Floating offshore construction either provided with a swivel stack for transfer of fluid across a rotary interface around a rotation axis between an incoming flow-line and an outgoing flow-line according to claim 1.

15. Method for manufacturing a swivel stack for transfer of fluid across a rotary interface around a rotation axis between an incoming flow-line and an outgoing flow-line, the method comprising:

providing a group of inner annular elements that comprises a lower annular element, an upper annular element and a central annular element;

centering the lower annular element around the rotation axis with an inner radius RI1 and a first outer radius;

centering the upper annular element around the rotation axis with the inner radius RI1 and the first outer radius;

centering the central annular element around the rotation axis and providing the central annular element with an outer cylindrical end surface;

positioning the central annular element between the lower annular element and the upper annular element, the central annular element having the inner radius and a second outer radius, with the second outer radius between inner radius and first outer radius, in a manner that a circular trench is present between an upward facing surface of the lower annular element and a downward facing surface of the upper annular element, the downward and upward facing surfaces each being perpendicular to the rotating axis;

the method further comprising:

centering an outer annular element around the rotation axis, the outer annular element having an inner end surface with a second inner radius and a third outer radius, with the third outer radius larger than the first outer radius and the second inner radius being substantially equal to the second outer radius with a gap between the outer annular element and the central inner annular element; the downward and upward facing surfaces of the outer annular element being directly adjacent to the upward facing surface of the lower annular element and the downward facing surface of the upper annular element, respectively;

positioning the inner end surface of the outer annular element abutting the flat cylindrical end surface of the central annular element, providing a circular trench in the inner end surface of the outer annular element, such that a toroidal chamber is formed between the central annular element and the outer annular element, providing the upward facing surface of the lower annular element and the downward facing surface of the upper annular element with a first stepped surface;

providing the upward and downward facing surfaces of the outer annular element with a second stepped surface; the first and second stepped surfaces being configured in a manner that at least two annular cavities centered around the rotation axis and having a rectangular cross-section are provided, half of the at least two annular cavities at a first interface between the downward facing surface of the upper annular element and the upward facing surface of the outer annular element and the other half of the at least two annular cavities at a second interface between the upward facing surface of the lower annular element and the downward facing surface of the outer annular element, respectively, wherein a radial width of the toroidal chamber is equal to or smaller than a height of the toroidal chamber, and the radial width of the toroidal chamber is smaller than a width of the two annular cavities combined.

16. Floating offshore construction comprising a turret mooring system according to claim 13.

17. The swivel stack according to claim 2, wherein in each interface said half of the at least two annular cavities are separated from each other by an interspace in radial direction.

18. The swivel stack according to claim 2, wherein in a radial direction each of the annular cavities is defined between an outward edge on one annular element selected from the group of inner annular elements and an inward edge on the outer annular element;

surfaces of the inward and outward edges being parallel to the direction of the rotation axis, and in the direction parallel to the rotation axis each of the annular cavities is defined at the first interface between the upward facing surface of the outer annular element and the downward facing surface of the upper annular element and at the second interface between the downward facing surface of the outer annular element and the upward facing surface of the lower annular element.

19. The swivel stack according to claim 3, wherein in a radial direction each of the annular cavities is defined between an outward edge on one annular element selected from the group of inner annular elements and an inward edge on the outer annular element;

surfaces of the inward and outward edges being parallel to the direction of the rotation axis, and in the direction parallel to the rotation axis each of the annular cavities is defined at the first interface between the upward facing surface of the outer annular element and the downward facing surface of the upper annular element and at the second interface between the downward facing surface of the outer annular element and the upward facing surface of the lower annular element.

20. The swivel stack according to claim 2, wherein each of the annular cavities is defined by a width WS in the radial direction and a depth HS in the direction parallel to the rotation axis.

* * * * *